United States Patent
Weistrand

(10) Patent No.: US 10,964,027 B2
(45) Date of Patent: Mar. 30, 2021

(54) IMAGE PROCESSING SYSTEM AND METHOD FOR INTERACTIVE CONTOURING OF THREE-DIMENSIONAL MEDICAL DATA

(71) Applicant: RaySearch Laboratories AB, Stockholm (SE)

(72) Inventor: Ola Weistrand, Huddinge (SE)

(73) Assignee: RaySearch Laboratories AB, Stockholm (SE)

( * ) Notice: Subject to any disclaimer, the term of this patent is extended or adjusted under 35 U.S.C. 154(b) by 147 days.

(21) Appl. No.: 16/334,508

(22) PCT Filed: Sep. 21, 2017

(86) PCT No.: PCT/EP2017/073962
§ 371 (c)(1),
(2) Date: Mar. 19, 2019

(87) PCT Pub. No.: WO2018/055064
PCT Pub. Date: Mar. 29, 2018

(65) Prior Publication Data
US 2020/0388038 A1  Dec. 10, 2020

(30) Foreign Application Priority Data
Sep. 22, 2016 (EP) .................................. 16190071

(51) Int. Cl.
*G06T 7/12* (2017.01)
*G06T 7/149* (2017.01)
(Continued)

(52) U.S. Cl.
CPC ................ *G06T 7/12* (2017.01); *G06T 7/149* (2017.01); *G06T 7/174* (2017.01); *G06T 17/20* (2013.01);
(Continued)

(58) Field of Classification Search
None
See application file for complete search history.

(56) References Cited

U.S. PATENT DOCUMENTS

| 6,842,638 | B1* | 1/2005 | Suri | A61B 6/481 |
| | | | | 382/128 |
| 2003/0056799 | A1* | 3/2003 | Young | G06T 7/149 |
| | | | | 600/425 |

(Continued)

OTHER PUBLICATIONS

Lu, Difei, et al. "Iterative mesh transformation for 3D segmentation of livers with cancers in CT images." Computerized Medical Imaging and Graphics 43 (2015): 1-14.*
Ecabert, Olivier, et al. "Automatic model-based segmentation of the heart in CT images." IEEE transactions on medical imaging 27.9 (2008): 1189-1201.*

(Continued)

*Primary Examiner* — Zhengxi Liu
(74) *Attorney, Agent, or Firm* — Faegre Drinker Biddle & Reath LLP

(57) ABSTRACT

An anatomic structure of interest is contoured in 3D source data by selecting a first subset of data in a first image slice, which has a first orientation in the source data. A first set of instructions identifies a first edge (E1) of the anatomic structure of interest in the first image slice. Then, a second subset of data is selected in a second image slice, which has a second orientation in the source data. A second set of instructions identifies a second edge (E2) of the anatomic structure of interest in the second image slice. A three-dimensional shell (3DS) is calculated based on the first and second edges (E1; E2) and the source data (SD). The three-dimensional shell (3DS) represents an approximation of a delimiting surface that separates the anatomic structure of interest from adjoining tissues in the 3D source data.

11 Claims, 5 Drawing Sheets

(51) Int. Cl.
*G06T 17/20* (2006.01)
*G06T 7/174* (2017.01)

(52) U.S. Cl.
CPC ............... *G06T 2207/20096* (2013.01); *G06T 2207/30004* (2013.01); *G06T 2210/41* (2013.01)

(56) References Cited

U.S. PATENT DOCUMENTS

| | | | | |
|---|---|---|---|---|
| 2008/0170791 | A1* | 7/2008 | Eskildsen | G06K 9/48 382/199 |
| 2011/0268330 | A1 | 11/2011 | Piper | |
| 2012/0189185 | A1* | 7/2012 | Chen | G06T 7/149 382/131 |
| 2012/0330635 | A1* | 12/2012 | Miga | G06T 7/33 703/11 |
| 2014/0126797 | A1 | 5/2014 | Kaus et al. | |
| 2017/0112473 | A1* | 4/2017 | Samset | A61B 8/06 |
| 2018/0235577 | A1* | 8/2018 | Buerger | G06T 7/174 |
| 2018/0256042 | A1* | 9/2018 | Beckers | A61B 5/026 |
| 2019/0287253 | A1* | 9/2019 | Weese | G06T 7/149 |

OTHER PUBLICATIONS

Eviatar, Hadass, and Ray L. Somorjai. "A fast, simple active contour algorithm for biomedical images." Pattern Recognition Letters 17.9 (1996): 969-974.*

Dong, Y., and Gilbert R. Hillman. "Three-dimensional reconstruction of irregular shapes based on a fitted mesh of contours." Image and Vision Computing 19.3 (2001): 165-176.*

De Bruin, P.W. et al., "Interactive 3D segmentation using connected orthogonal contours," Computers in Biology and Medicine 35 (2005), pp. 329-346.

Pekar, Vladimir et al., "Automated Model-Based Organ Delineation for Radiotherapy Planning in Prostatic Region," Int. J. Radiation Oncology Biol. Phys., vol. 60, No. 3, 2004, pp. 973-980.

Tutar, Ismail B. et al., "Semiautomatic 3-D Prostate Segmentation from TRUS Images Using Spherical Harmonics," IEEE Transactions on Medical Imaging, vol. 25, No. 12, Dec. 2006, pp. 1645-1654.

Wimmer, Andreas et al., "Two-stage Semi-automatic Organ Segmentation Framework using Radial Basis Functions and Level Sets," 10th International Conference on Medical Image Computing and Computer Assisted Intervention, MICCAI 2007, 3D Segmentation in the Clinic: Grand Challenge, Oct. 29, 2007 (Oct. 29, 2007), pp. 179-188.

Ning, H., et al, "Prostate boundary segmentation from 3D ultrasound images," Medical Physics, AIP, Melville, NY, US, vol. 30, No. 7, Jul. 1, 2003 (Jul. 1, 2003), pp. 1648-1659.

* cited by examiner

IMAGE PROCESSING SYSTEM AND METHOD FOR INTERACTIVE CONTOURING OF THREE-DIMENSIONAL MEDICAL DATA

This application is the National Stage of International Application No. PCT/EP2017/073962, filed Sep. 21, 2017, and claims benefit of European Patent Application No. 16190071.7, filed Sep. 22, 2016, the entire contents of which are incorporated by reference herein.

THE BACKGROUND OF THE INVENTION AND PRIOR ART

The present invention relates generally to solutions for enhancing the information contents of medical image data. More particularly the invention relates to an image processing system according to the preamble of claim 1 and a corresponding method. The invention also relates to a computer program and a processor-readable medium.

The process of defining which voxels that represent a particular anatomic structure, or so-called organ delineation, is one of the most tedious and time-consuming parts of radiotherapy planning. This process usually involves manual contouring in two-dimensional slices using simple drawing tools, and it may take several hours to delineate all structures of interest in a three-dimensional data set of high resolution used for planning.

Pekar, V., et al., "Automated Model-Based Organ Delineation for Radiotherapy Planning in Prostatic Region", International Journal of Radiation Oncology—Biology—Physics, Vol. 60, No. 3, pp 973-980, 2004 discloses a method for adapting 3D deformable surface models to the boundaries of anatomic structures of interest. The adaptation is based on a tradeoff between deformations of the model induced by its attraction to certain image features and the shape integrity of the model. Problematic areas where the automated model adaptation may fail can be corrected via interactive tools.

US 2011/0268330 describes systems and methods for contouring a set of medical images. An example system may include an image database, an image deformation engine and a contour transformation engine. The image database may be used to store a set of medical images. The image deformation engine may be configured to receive a source image and a target image from the set of medical images in the image database, and may be further configured to use a deformation algorithm with the source image and the target image to generate deformation field data that is indicative of changes between one or more objects from the source image to the target image. The contour transformation engine may be configured to receive source contour data that identifies the one or more objects within the source image, and be further configured to use the deformation field data and the source contour data to generate automatic target contour data that identifies the one or more objects within the target image. The image deformation engine and the contour transformation engine may comprise software instructions stored in one or more memory devices and be executable by one or more processors.

Wimmer, A., et al, "Two-stage Semi-automatic Organ Segmentation Framework using Radial Basis Functions and Level Sets", 10$^{th}$ International Conference on Medical Image Computing and Computer Assisted Intervention, MICCAI 2007, 3D Segmentation in The Clinic: Grand Challenge, 29 Oct. 2007, pages 179-188 discloses a two-stage semi-automatic algorithm that is able to segment complex structures like the liver shape with moderate user interaction. A first stage of the algorithm involves manual delineation of cross-sections of the anatomical structure in 2D multi-planar reconstruction views. From this set of contours, an initial 3D surface is reconstructed using radial basis functions. In a second step, the surface is evolved using a level set algorithm incorporating a new combination of both image information and shape information, the latter being derived from the initial contours.

US 2014/0126797 describes an apparatus for delineating a structure of interest. A plane selection interface for selecting a contouring plane of selectable orientation in a three-dimensional image or map; a contouring interface for defining a contour in the selected contour plane; and a mesh constructor configured to construct a three-dimensional polygonal mesh delineating the structure of interest in the three-dimensional image or map are included. The mesh constructor positions are constrained vertices on or near a plurality of non-coplanar delineation contours defined using the contouring interface.

Tutar, I. B., et al, "Semiautomatic 3-D Prostate Segmentation from TRUS Images Using Spherical Harmonics", IEEE TRANSACTIONS ON MEDICAL IMAGING, IEEE SERVICE CENTER, Piscataway, N.J., U.S., Vol. 25, No. 12, 1 Dec. 2006 pages 1645-1654 shows a solution for reconstructing seed locations from fluoroscopic images and identifying prostate boundaries in ultrasound images to perform dosimetry in the operating room. Specifically, a segmentation method is proposed, which defines an optimization framework as fitting the best surface to the underlying images under shape constraints. This involves modeling the shape of the prostate using spherical harmonics of degree eight and performing statistical analysis on the shape parameters. After user initialization, the algorithm identifies the prostate boundaries on the average in two minutes.

Ning, H., et al, "Prostate boundary segmentation from 3D ultrasound images", MEDICAL PHYSICS, AIP, Melville, N.Y., U.S., Vol. 30, No. 7, 1 Jul. 2003, pages 1648-1659 describes an algorithm for semiautomatic segmentation of the prostate from 3D ultrasound images. The algorithm uses model-based initialization and mesh refinement using an efficient deformable model. Initialization requires the user to select six points from which the outline of the prostate is estimated using shape information. The estimated outline is then automatically deformed to better fit the prostate boundary. An editing tool allows the user to edit the boundary in problematic regions and then deform the model again to improve the final results.

PROBLEMS ASSOCIATED WITH THE PRIOR ART

The above solutions may be capable of providing a satisfying end result for predefined types of organs, i.e. structures of interest within a certain range of shapes. However, it may be problematic and/or time consuming to delineate a general structure of interest whose shape does not fit a library of stored contours based upon which the delineation is performed.

SUMMARY OF THE INVENTION

The object of the present invention is therefore to offer a solution which, on one hand, requires a relatively low degree of manual intervention; and, on the other hand, provides an improved geometrical interpolation in a three-dimensional image data set.

According to one aspect of the invention, the object is achieved by the initially described arrangement; wherein, after having received the first set of instructions, the processing unit is configured to effect the following. Select a second subset of the source data defining a second two-dimensional graphic representation of the source data, which is arranged in a second image slice through the anatomic structure of interest having a second orientation in the source data. The second orientation is here different from the first orientation. Then, the processing unit is configured to generate control instructions configured to cause the second interface to output the second subset of the source data for presentation on the graphical display. Via the third interface, the processing unit is configured to receive a second set of instructions identifying a second edge of the anatomic structure of interest in the second image slice. Thereafter, based on the first and second edges and the source data, the processing unit is configured to calculate a three-dimensional shell representing an approximation of a delimiting surface of the anatomic structure of interest.

This arrangement is advantageous because the joint use of the first and second edges and the source data enables reaching a high-quality delineation of the anatomic structure of interest in relatively few discrete steps. Other advantages are that no contour libraries are required. Further, the different subsets of source data need not be especially similar to one another. In other words, the image slices can be separated from one another by a relatively large angle. Of course, this makes the solution highly flexible from a user perspective.

According to one embodiment of this aspect of the invention, the processing unit is configured to calculate an initial estimate of the three-dimensional shell in the form of a three-dimensional convex hull. Thereby, the anatomic structure of interest can be modeled in a non-ambiguous and efficient manner.

According to another embodiment of this aspect of the invention, the second image slice is oriented orthogonal to the first image slice. Namely, thereby a three-dimensional shell modeling a large class of generally convex-shaped as well as generally non-convex shaped anatomic structures can be calculated in relatively few iterative steps.

Further preferably, the processing unit is configured to calculate the three-dimensional shell iteratively. Here, a first iteration of a triangular mesh structure approximating the three-dimensional shell to an estimated perimeter of the anatomic structure of interest is generated as described below. The triangular mesh structure includes a set of vertices each in which a number of triangles of the mesh structure meet. The first iteration of the triangular mesh structure involves an analysis of a first intersection between the three-dimensional shell and a first plane defined by the first image slice. The analysis also involves a second intersection between the three-dimensional shell and a second plane defined by the second image slice. The analysis includes the following steps. For a triangle of the triangular mesh structure forming a part of the first intersection, the processing unit is configured to search for an image point on the first edge along a direction of a projected surface normal to said triangle. The image point must be located within a search range from the intersection. If such an image point is found, the processing unit is configured to assign an image feature of the image point found to the triangle of the triangular mesh structure. Analogously, for a triangle of the triangular mesh structure forming a part of the second intersection, the processing unit is configured to search for an image point on the first edge along a direction of a projected surface normal to the triangle. The image point must be located within a search range from the intersection, and if such an image point is found, the processing unit is further configured to assign an image feature of the image point found to the triangle of the triangular mesh structure. Thereby, adequate image features are assigned to the triangular mesh structure even if this structure initially does not match the geometry of the anatomic structure of interest.

According to yet another embodiment of this aspect of the invention, the processing unit is configured to generate at least one further iteration of the triangular mesh structure based on the first iteration of the triangular mesh structure and any previous iteration generated subsequent to the first iteration. Each of the at least one further iteration represents an approximation of the estimated perimeter, which is an improvement relative to the first iteration with respect to an overall distance measure between the estimated perimeter and the vertices of the triangular mesh structure with respect to the image features assigned to the triangles and the source data. Thereby, the estimates of the three-dimensional shell are held geometrically close both to the manually drawn contours and the image data, which vouches for an end result of high-quality. The proposed representation of the perimeter of the anatomic structure of interest in the form of a triangular mesh structure enables efficient graphical processing and visualization.

According to one further embodiment of this aspect of the invention, the processing unit is configured to select at least one further subset of the source data in addition to the first and second subsets. The at least one further subset defines at least one further two-dimensional graphic representation of the source data arranged in at least one further image slice through the anatomic structure of interest, which has an orientation different from the first and second orientations in the source data. For each of the at least one further subset, the processing unit is configured to generate control instructions configured to cause the second interface to output the at least one further subset of the source data for presentation on the graphical display. Then, in response to at least one further set of instructions received via the third interface, the processing unit is configured identify at least one further edge of the anatomic structure of interest in the at least one further image slice. Subsequently, based on the first, second and at least one further edge and the source data, the processing unit is configured to calculate an improved version of the three-dimensional shell representing a surface estimate of the anatomic structure of interest. This means that the user can conveniently assist and speed up the automatic delineation process by adding one or more manually drawn contours.

According to yet another embodiment of this aspect of the invention, the third interface is configured to forward a supplementary set of instructions to the processing unit, which the supplementary set of instructions identifies an adjusted edge of the anatomic structure of interest in at least one of said image slices. Moreover, the processing unit is configured to calculate the three-dimensional shell on the further basis of the adjusted edge. Thus, the user can also fine-tune the delineation process by manually changing the outline of an edge of the anatomic structure of interest in an intuitive manner.

According to still another embodiment of this aspect of the invention, the third interface is specifically configured to receive the sets of instructions in the form of user commands, for example generated via a computer mouse or similar pointing device.

According to another aspect of the invention, the object is achieved by the method described initially; wherein, after having received the first set of instructions, a second subset of the source data selected, which second subset defines a second two-dimensional graphic representation of the source data. The second subset is arranged in a second image slice through the anatomic structure of interest having a second orientation in the source data. The second orientation is here different from the first orientation. Via the second interface, the second subset of the source data is output for presentation on the graphical display. Thereafter, in response to a second set of instructions received via the third interface, a second edge of the anatomic structure of interest is identified in the second image slice. Finally, a three-dimensional shell is calculated based on the first and second edges and the source data. The three-dimensional shell represents an approximation of a delimiting surface of the anatomic structure of interest. The advantages of this method, as well as the preferred embodiments thereof, are apparent from the discussion above with reference to the proposed system.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
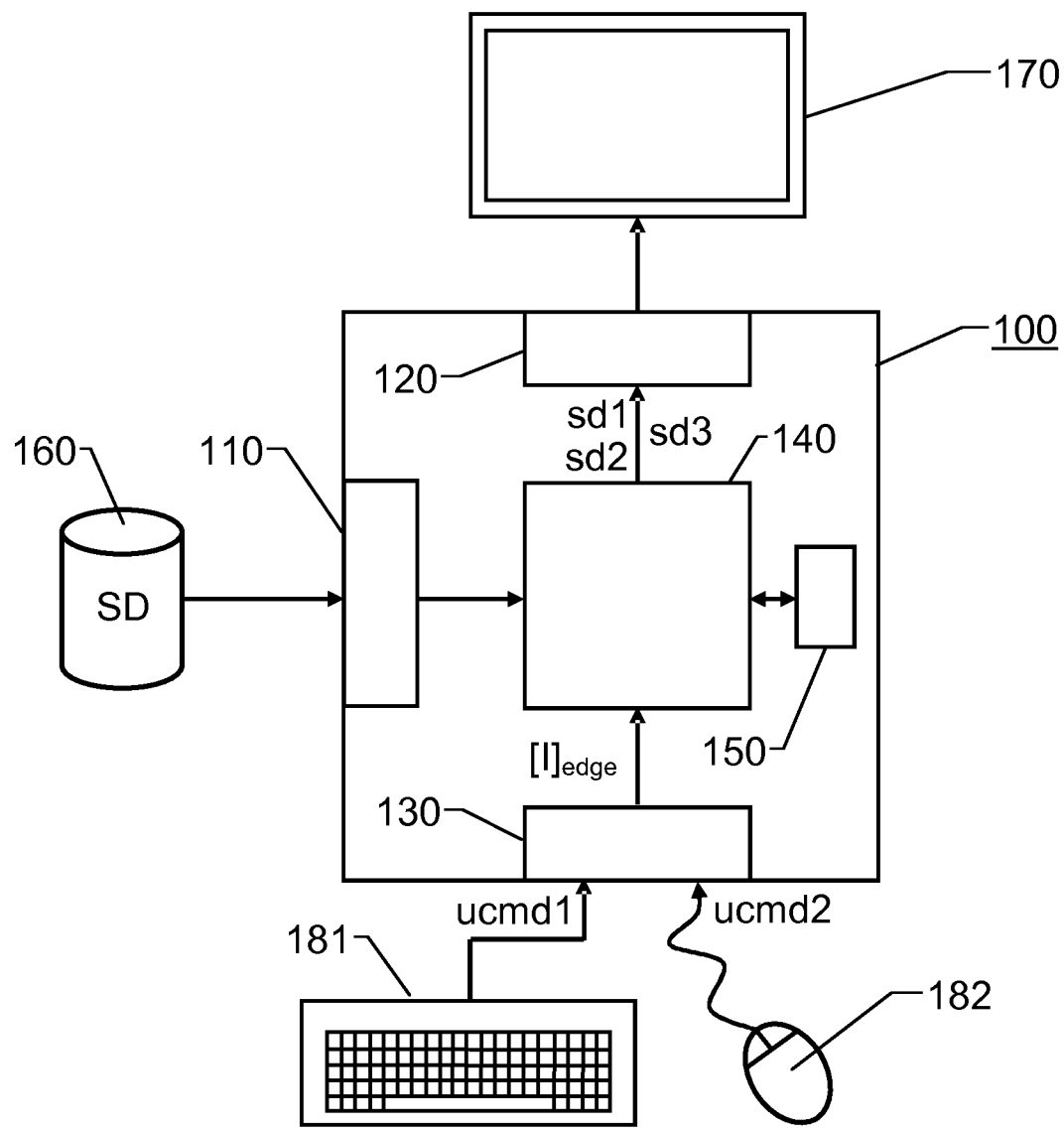
FIG. 1 shows an overview of a system according to one embodiment of the invention.

FIG. 1 shows an overview of an image processing system 100 for contouring three-dimensional medical image data according to one embodiment of the invention. The system 100 includes a processing unit 140 plus first, second and third interfaces 110, 120 and 130 respectively. Preferably, a memory 150 is also included, which stores software for executing the below-described procedure when the software is being run on the processing unit 140. For presentation purposes, FIG. 1 illustrates the interfaces 110, 120 and 130 as separate entities. However, in a practical implementation, two or more of the interfaces may be integrated into a common unit.

The first interface 110 is configured to enable the processing unit 140 access to source data SD in the form of three-dimensional medical image data that represent an anatomic structure of interest. The source data SD also contains tissues adjoining the anatomic structure of interest. The purpose of the proposed system 100 is to contour, or delineate, the anatomic structure of interest so that this structure can be distinguished from the adjoining tissues, for example in order to plan a radiotherapy treatment of the anatomic structure of interest.

Figure 2:
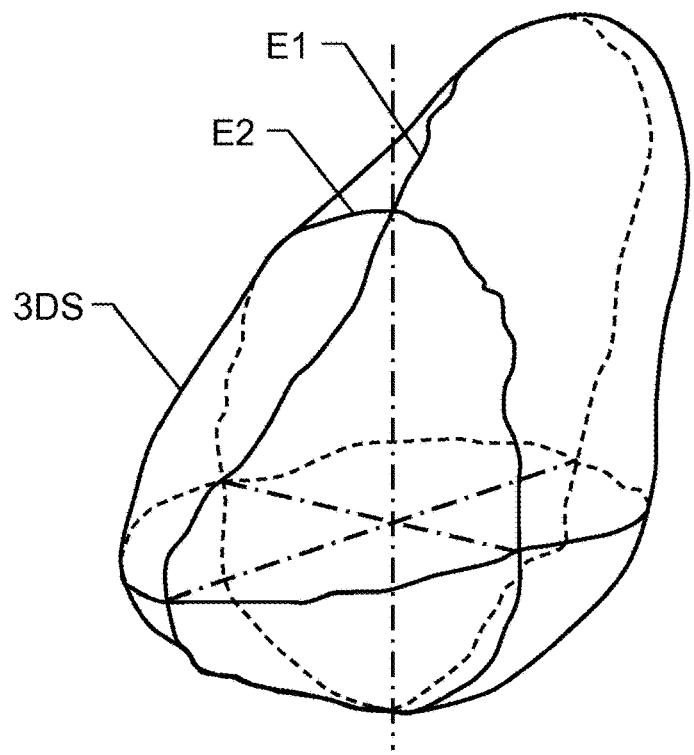
FIG. 2 illustrates how the edges of the anatomic structure of interest may be identified in two different image slices in the source data according to one embodiment of the invention.

Referring now also to FIG. 2, the processing unit 140 is configured to select a first subset sd1 of the source data SD defining a first two-dimensional graphic representation of the source data SD arranged in a first image slice through the anatomic structure of interest that has a first orientation in the source data SD.

The second interface 120 is configured to output the first subset of the source data sd1 for presentation on a graphical display 170. The first subset of the source data sd1 is output in response to control instructions from the processing unit 140.

The third interface 130 is configured to forward a first set of instructions $[I]_{edge}$ to the processing unit 140. The first set of instructions $[I]_{edge}$ identifies a first edge E1 of the anatomic structure of interest in the first image slice, and is preferably generated in response to user commands ucmd1 and/or ucmd2 entered via a keyboard and/or computer mouse, or similar pointing device.

FIG. 2 illustrates how the first edge E1 follows the shape the anatomic structure of interest in the source data SD in the first subset of the source data sd1 represented by the first image slice.

After having received the first set of instructions $[I]_{edge}$, the processing unit 140 is configured to select a second subset sd2 of the source data SD defining a second two-dimensional graphic representation of the source data SD. The second subset sd2 is arranged in a second image slice through the anatomic structure of interest. The second image slice has a second orientation in the source data SD, which second orientation is different from the first orientation. In other words, the second subset sd2 contains a separate two-dimensional slice of data from the source data SD, and this slice of data is not parallel with the slice represented by the first subset sd1. It is generally advantageous if the first and second image slices are orthogonal to one another.

The processing unit is configured to generate control instructions adapted to cause the second interface 120 to output the second subset sd2 of the source data SD for presentation on the graphical display 170, i.e. such that a user can observe it visually and generate commands for describing a second edge E2 of the anatomic structure of interest in the second image slice Therefore, the processing unit is also configured to receive, via the third interface 130, a second set of instructions $[I]_{edge}$ identifying the second edge E2 of the anatomic structure of interest in the second image slice. Analogous to the above, the second set of instructions $[I]_{edge}$ is preferably generated in response to user commands ucmd1 and/or ucmd2 entered via a keyboard and/or computer mouse, or similar pointing device.

Finally, the processing unit 140 is configured to calculate a three-dimensional shell 3DS based on the first and second edges E1 and E2 respectively and the source data SD. Here, the three-dimensional shell 3DS represents an approximation of a delimiting surface of the anatomic structure of interest. The three-dimensional shell 3DS may be computed by means of a deformable surface model, which is adapted iteratively by solving a non-linear optimization problem that incorporates both the source data SD and geometric distances to the first and second edges E1 and E2 in the objective function. This approach is beneficial because it ensures that the three-dimensional shell 3DS is tied closely to the user input, i.e. the user commands ucmd1 and/or ucmd2 defining the first and second edges E1 and E2. It also reaches a high-quality result in relatively few discrete steps.

In retrospect, the user may realize that an already drawn contour, e.g. the first edge E1 and/or the second edge E2, should have had a somewhat different outline to better match the image contents of source data SD. Therefore, according to one embodiment of the invention, the third interface 130 is configured to forward a supplementary set of instructions $[I]_{edge}$ to the processing unit 140, which supplementary set of instructions $[I]_{edge}$ identifies an adjusted edge of the anatomic structure of interest in at least one of said image slices. Again, preferably, the supplementary set of instructions $[I]_{edge}$ is generated in response to user commands ucmd1 and/or ucmd2 that have been entered via a keyboard and/or computer mouse, or similar pointing device. The processing unit 140 is further configured to calculate the three-dimensional shell 3DS on the further basis of the adjusted edge.

Alternatively and/or additionally, for improved accuracy and to speed up the convergence of the algorithm, according to one embodiment of the invention, the processing unit 140 is configured to calculate the three-dimensional shell 3DS on the further basis of one or more edges in addition to the first and second edges E1 and E2.

Figure 3:
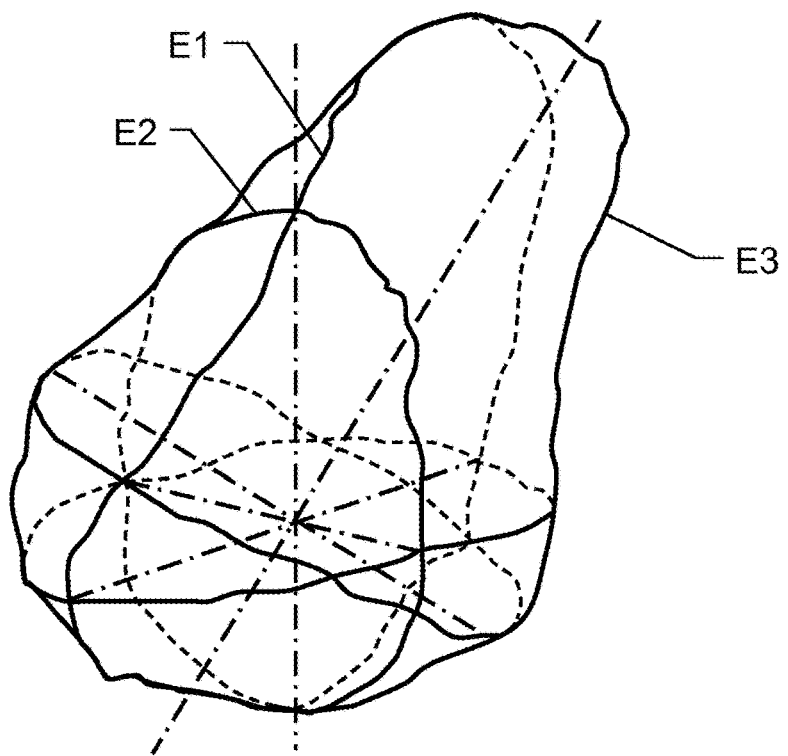
FIG. 3 illustrates how an additional edge of the anatomic structure of interest may be identified in a third image slice in the source data according to one embodiment of the invention.

FIG. 3 illustrates how such an additional edge E3 of the anatomic structure of interest may be identified in a third image slice in the source data SD.

Here, the processing unit 140 is configured to select at least one further subset sd3 of the source data SD in addition to the first and second subsets sd1 and sd2 respectively. The at least one further subset sd3 defines at least one further two-dimensional graphic representation of the source data SD arranged in at least one image slice through the anatomic structure of interest in addition to the first and second image slices. The at least one further image slice has a further orientation in the source data SD, which further orientation is different from the first and second orientations, for example orthogonal to each of the first and second orientations.

The processing unit 140 is also adapted to generate, for each of the at least one further subset sd3, control instructions configured to cause the second interface 120 to output the at least one further subset sd3 of the source data SD for presentation on the graphical display 170.

Moreover, the processing unit 140 is configured to receive, via the third interface 130, at least one further set of instructions $[I]_{edge}$ identifying at least one edge E3 of the anatomic structure of interest in the second image slice in addition to the first and second edges E1 and E2 respectively. Based on the first, second and at least one further edges E1, E2 and E3 and the source data SD, the processing unit 140 is configured to calculate an improved three-dimensional shell 3DS representing a surface estimate of the anatomic structure of interest. Here, the improved version of the three-dimensional shell 3DS represents an updated surface estimate of the anatomic structure of interest.

Figure 6:
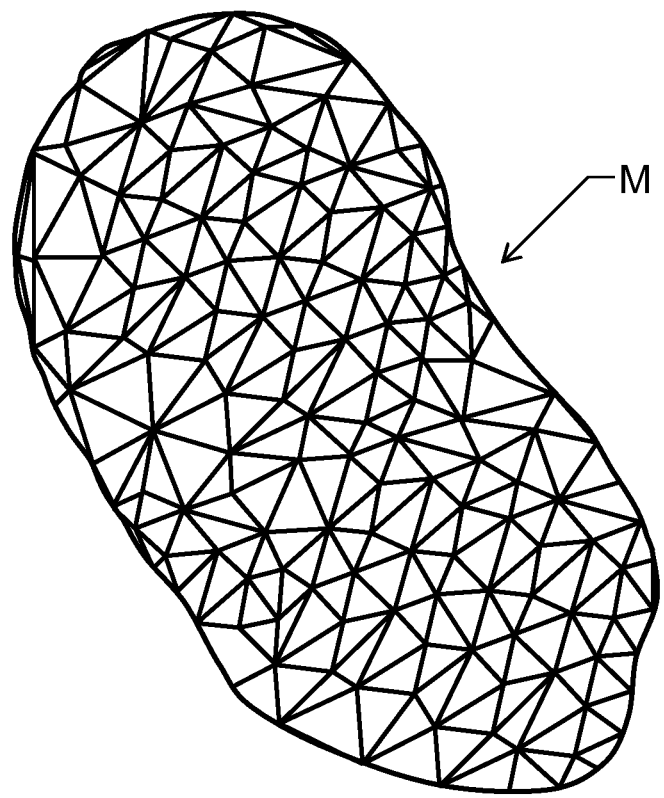
FIG. 6 shows an example of a triangular mesh generated according one embodiment of the invention.

FIG. 6 shows an example of a triangular mesh M that approximates the three-dimensional shell 3DS to an estimated perimeter P of the anatomic structure of interest. The triangular mesh structure M includes a set of vertices v each in which a number of triangles of the mesh structure M meet. A triangular-mesh representation of this type is beneficial because it enables efficient graphical processing and visualization of the data.

Figure 4:
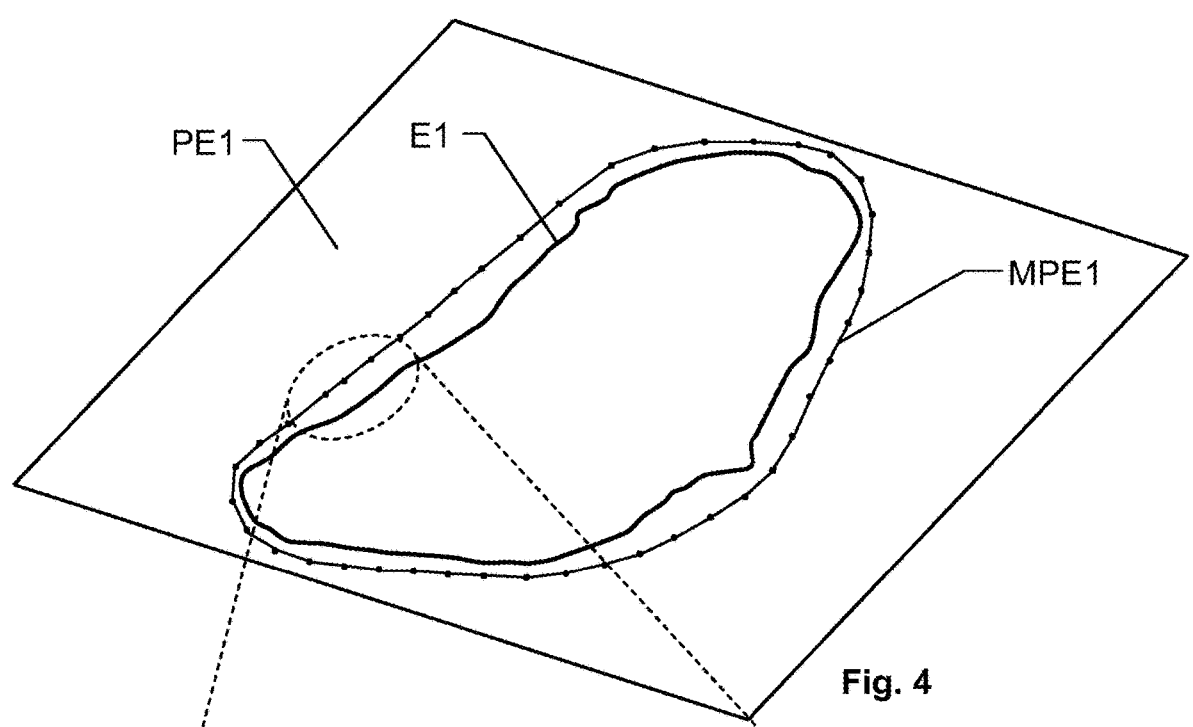
FIGS. 4-5 illustrate how a first iteration of a triangular mesh structure approximating a perimeter of the anatomic structure of interest is generated according to one embodiment of the invention.
Figure 5:
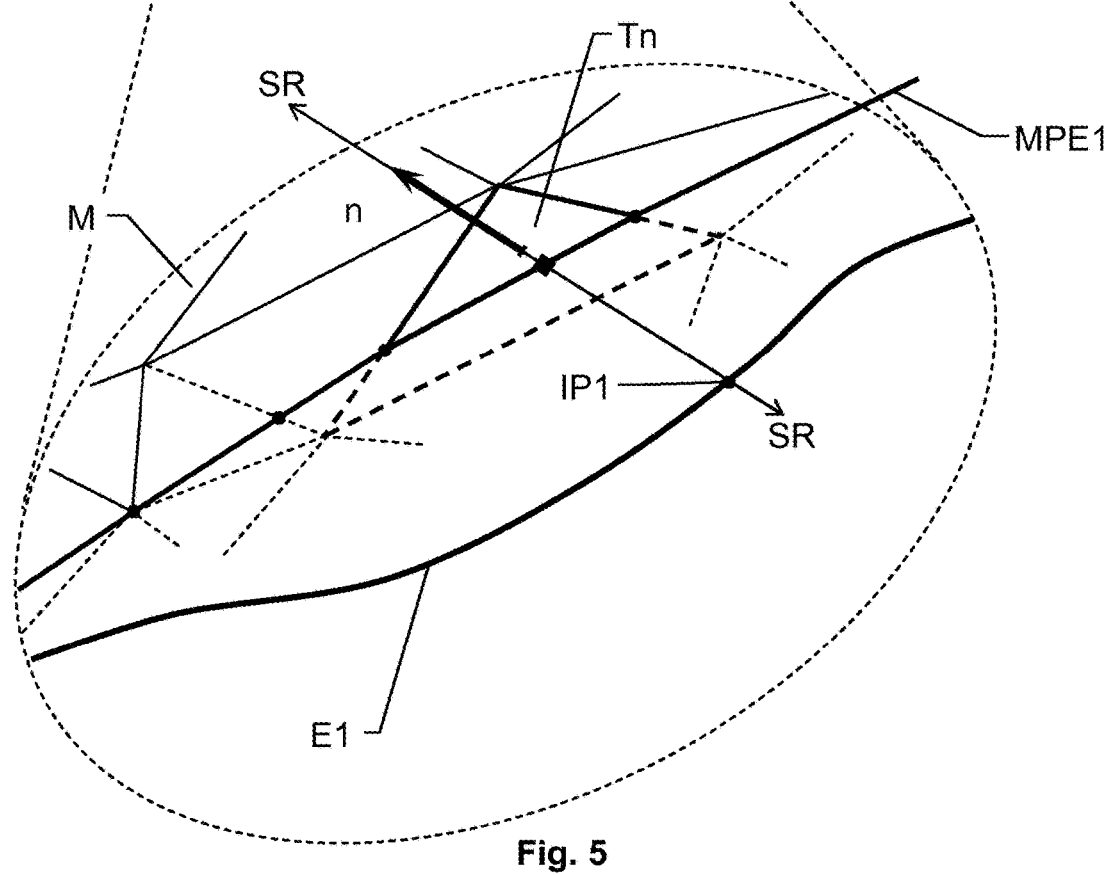

Referring now to FIGS. 4 and 5, we will explain how the processing unit 140 is configured to generate a first iteration of the triangular mesh structure M according to one embodiment of the invention. FIG. 4 illustrates a first plane PE1 defined by the first image slice. FIG. 4 also shows a first intersection MPE1 between the three-dimensional shell 3DS and the first plane PE1. Since the three-dimensional shell 3DS is based on a three-dimensional convex hull, the outline of the first intersection MPE1 likewise has an overall convex shape. Moreover, at least initially, the first intersection MPE1 lies outside of the first edge E1.

The first iteration of the triangular mesh structure M involves an analysis of the first intersection MPE1 and the first plane PE1. The first iteration also involves an analysis of a second intersection between the three-dimensional shell 3DS and a second plane defined by the second image slice.

The analysis, in turn, includes the following steps. For each triangle Tn of the triangular mesh structure M that forms a part of the first intersection MPE1, the processing unit 140 is configured to search for an image point IP1 on the first edge E1 along a direction of a projected surface normal n to the triangle Tn. The image point IP1 must be located within a search range SR from the intersection MPE1. The search range SR is preferably a parameter, which is defined based on the characteristics anatomic structure of interest. Typically, for relatively small structures and/or structures having complex surfaces, the search range SR is comparatively short; and vice versa, for relatively large structures and/or structures having surfaces of low complexity, the search range SR is comparatively long. In any case, if such an image point IP1 is found, the processing unit 140 is configured to assign an image feature of the image point IP1 found to the triangle Tn.

Similarly, although this is not illustrated in any drawing, for a triangle of the triangular mesh structure M forming a part of the second intersection, the processing unit 140 is configured to search for an image point on the second edge E2 along a direction of a projected surface normal to said triangle. Again, the image point must be located within a search range from the intersection; and if such an image point is found, the processing unit 140 is configured to assign an image feature of the image point found to the triangle of the triangular mesh structure M.

Finally, in the first iteration of the triangular mesh structure M, the triangles of the triangular mesh structure M that do not form a part of any of the first or second intersections are assigned a respective image feature, which is derived as a weighted average between the image features of the triangles Tn that do form a part of the intersections.

Figure 7:
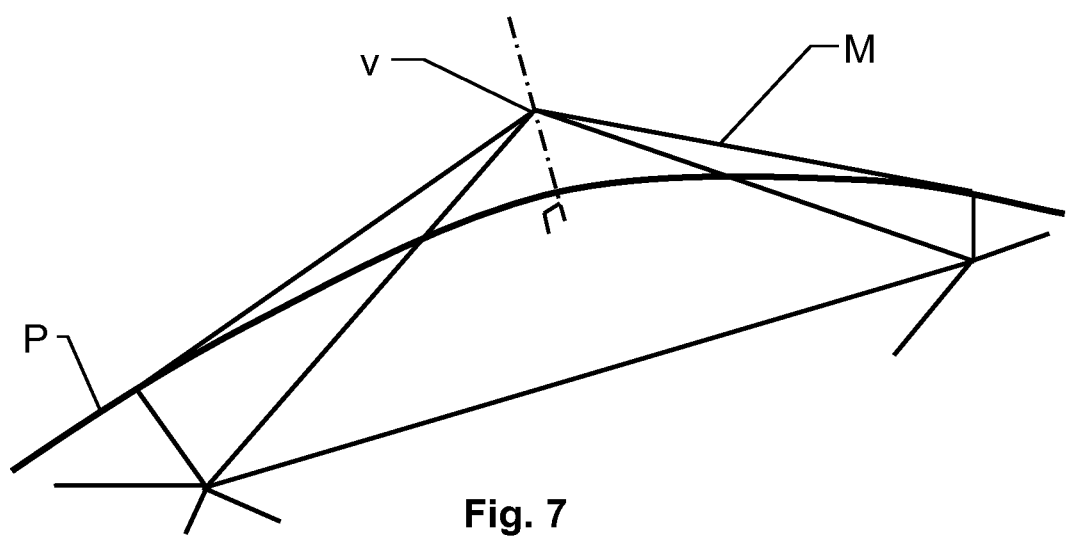
FIG. 7 illustrates a distance measure in relation to the proposed triangular mesh.

The mesh structure M is then successively adapted to match the first and second edges E1 and E2 respectively as well as the source data SD in a discrete number of steps. Here, a current approximating surface is used as constraining surface to the adaptation. Preferably, the processing unit 140 is configured to generate at least one further iteration of the triangular mesh structure M in addition to the first iteration based on the first iteration of the triangular mesh structure M and any previous iteration generated subsequent to the first iteration. Here, each of the at least one further iteration represents an approximation of the estimated perimeter P, which is an improvement relative to the first iteration with respect to an overall distance measure between the estimated perimeter P and the vertices v of the triangular mesh structure M with respect to the image features assigned to the triangles Tn and the source data SD. FIG. 7 schematically shows this distance measure in relation to the triangular mesh M and the estimated perimeter P.

It is generally advantageous if the processing unit 140 is configured to effect the above-mentioned procedure by executing a computer program. The processing unit 140 is therefore preferably communicatively connected to a memory unit storing a computer program product, which, in turn, contains instructions executable by the processing unit 140; whereby the processing unit 140 is operative to execute the above-described actions when the computer program product is run on the processing unit 140.

Figure 8:
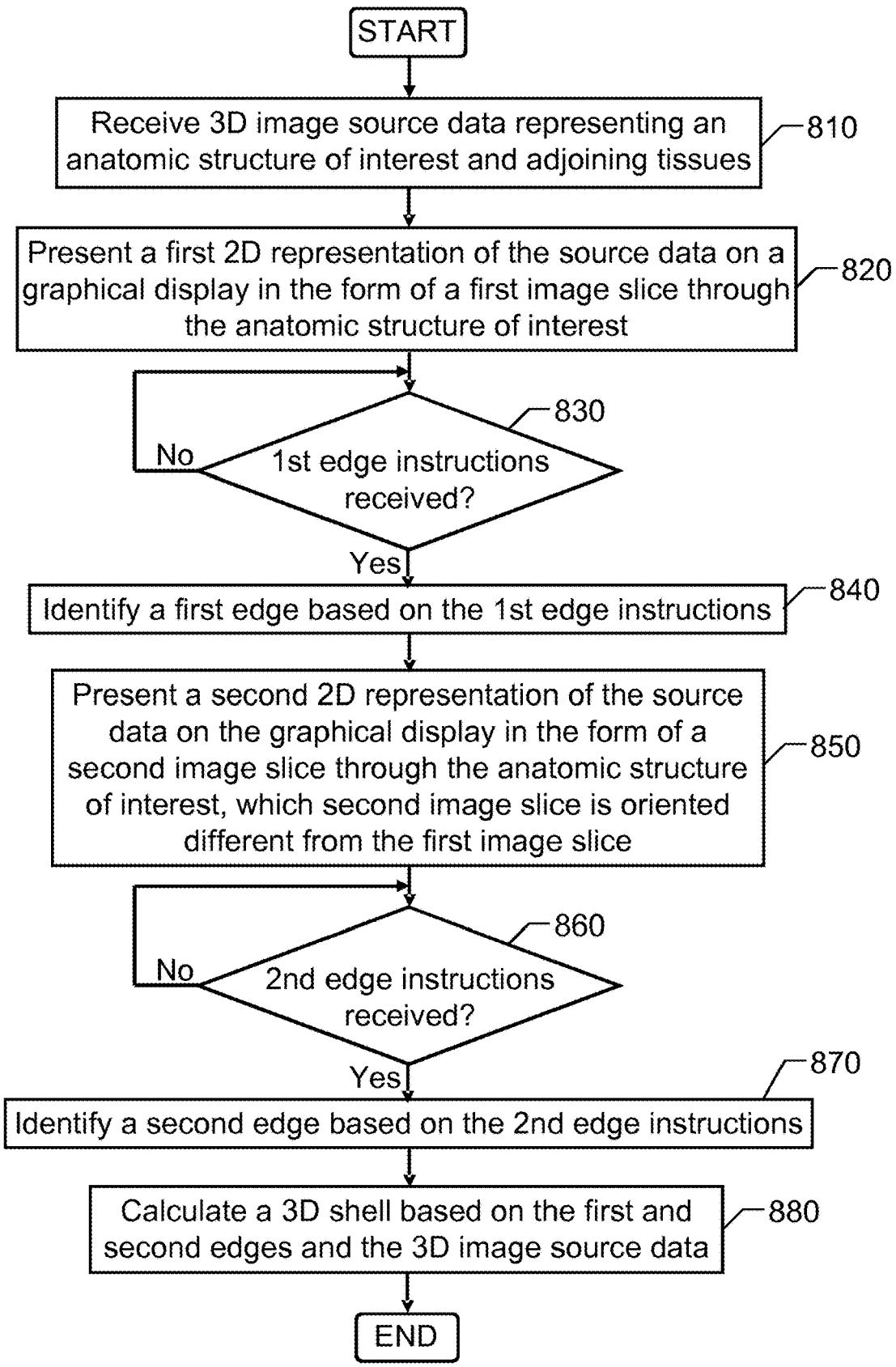
FIG. 8 illustrates, by means of a flow diagram, the general method according to the invention.

In order to sum up, and with reference to the flow diagram in FIG. 8, we will now describe the general method according to the invention for contouring three-dimensional medical image data.

In a first step 810, source data are received, which represent a 3D image of an anatomic structure of interest as well as tissues adjoining the anatomic structure of interest.

Then, in a step 820, a first subset of the source data is selected and presented on a graphical display. The first subset of the source data defines a first two-dimensional graphic representation of the source data, and the first subset is arranged in a first image slice through the anatomic structure of interest, which has a first orientation in the source data.

Subsequently, a step 830 checks if a first set of instructions has been received. Preferably, the first set of instructions are generated in response to manual commands entered by a user, for example via a computer mouse. If such a first set of instructions has been received, the procedure continues to a step 840. Otherwise, the procedure loops back and stays in step 830.

In step 840, a first edge of the anatomic structure of interest is identified in the first image slice in response to the first set of instructions. Preferably, graphics illustrating the first edge is also presented on the graphical display as feedback to the user.

Then, in a step 850, a second subset of the source data is selected and presented on the graphical display. The second subset of the source data defines a second two-dimensional graphic representation of the source data, and the second subset is arranged in a second image slice through the anatomic structure of interest. The second image slice has a second orientation in the source data, which second orientation is different from the first orientation.

Subsequently, a step 860 checks if a second set of instructions has been received. Analogous to the above, the second set of instructions are preferably generated in response to manual commands entered by a user, for example via a computer mouse. If such a second set of instructions has been received, the procedure continues to a step 870. Otherwise, the procedure loops back and stays in step 860.

In step 870, a second edge of the anatomic structure of interest is identified in the second image slice in response to the second set of instructions.

Thereafter, in a step 880, a three-dimensional shell is calculated based on the first and second edges and the source data. The three-dimensional shell represents an approximation of a delimiting surface of the anatomic structure of interest, and the three-dimensional shell, as such, is calculated iteratively.

All of the process steps, as well as any sub-sequence of steps, described with reference to FIG. 8 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An image processing system for contouring three-dimensional medical image data, the system comprising:
   a processing unit and first, second, and third interfaces,
   the first interface being configured to enable the processing unit to access source data in the form of the three-dimensional medical image data, which source data represent an anatomic structure of interest that is to be contoured, and tissues adjoining the anatomic structure of interest;
   the processing unit being configured to select a first subset of the source data defining a first two-dimensional graphic representation of the source data arranged in a first image slice through the anatomic structure of interest, the first image slice having a first orientation in the source data;
   the second interface being configured to, in response to control instructions from the processing unit, output the first subset of the source data for presentation on a graphical display; and the third interface being configured to forward a first set of instructions to the processing unit, the first set of instructions being received in the form of user commands and identifying a first edge of the anatomic structure of interest in the first image slice, and after having received the first set of instructions, the processing unit is configured to:

select a second subset of the source data defining a second two-dimensional graphic representation of the source data arranged in a second image slice through the anatomic structure of interest, the second image slice having a second orientation in the source data, which second orientation is different from the first orientation;

generate control instructions configured to cause the second interface to output the second subset of the source data for presentation on the graphical display;

receive, via the third interface, a second set of instructions, the second set of instructions being received in the form of user commands and identifying a second edge of the anatomic structure of interest in the second image slice; and calculate a three-dimensional shell based on the first and second edges and the source data, the three-dimensional shell representing an approximation of a delimiting surface of the anatomic structure of interest, wherein the calculation is configured to generate a first iteration of a triangular mesh structure approximating the three-dimensional shell to an estimated perimeter of the anatomic structure of interest, the triangular mesh structure including a set of vertices each in which a number of triangles of the mesh structure meet, and the first iteration of the triangular mesh structure involving an analysis of:

a first intersection between the three-dimensional shell and a first plane defined by the first image slice, and a second intersection between the three-dimensional shell and a second plane defined by the second image slice, the analysis comprising, for a triangle of the triangular mesh structure forming a part of the first intersection:

searching for an image point on the first edge along a direction of a projected surface normal to said triangle, the image point being located within a search range from the first intersection, and if such an image point is found assigning an image feature of the image point found to the triangle of the triangular mesh structure; and for a second triangle of the triangular mesh structure forming a part of the second intersection:

searching for a second image point on the second edge along a direction of a projected surface normal to said second triangle, the second image point being located within a search range from the second intersection, and if such an image point is found assigning an image feature of the second image point found to the second triangle of the triangular mesh structure.

2. The system according to claim 1, wherein the processing unit is configured to calculate an initial estimate of the three-dimensional shell in the form of a three-dimensional convex hull.

3. The system according to claim 1, wherein the second image slice is oriented orthogonal to the first image slice.

4. The system according to claim 1, wherein, for each triangle of the first iteration of the triangular mesh structure that does not form a part of any of the first or second intersections, the processing unit is configured to assign a respective image feature, which is derived as a weighted average between the image features of the triangles forming a part of the first or second intersections.

5. The system according to claim 4, wherein the processing unit is configured to:

generate at least one further iteration of the triangular mesh structure based on the first iteration of the triangular mesh structure and any previous iteration generated subsequent to the first iteration, each of the at least one further iteration representing an approximation of the estimated perimeter which is an improvement relative to the first iteration with respect to an overall distance measure between the estimated perimeter and the vertices of the triangular mesh structure with respect to the image features assigned to the triangles and the source data.

6. The system according to claim 1, wherein the processing unit is configured to:

select at least one further subset of the source data in addition to the first and second subsets, the at least one further subset defining at least one further two-dimensional graphic representation of the source data arranged in at least one image slice through the anatomic structure of interest in addition to the first and second image slices, the at least one further image slice having a further orientation in the source data, which further orientation is different from the first and second orientations;

generate, for each of the at least one further subset, control instructions configured to cause the second interface to output the at least one further subset of the source data for presentation on the graphical display;

receive, via the third interface, at least one further set of instructions, the further set of instruction being received in the form of user commands and identifying at least one edge of the anatomic structure of interest in the at least one further image slice in addition to the first and second edges; and calculate, based on the first, second, and at least one further edges and the source data, an improved three-dimensional shell representing a surface estimate of the anatomic structure of interest.

7. The system according to claim 6, wherein the processing unit is further configured to generate at least one further iteration of the triangular mesh structure in addition to the first iteration, the at least one further iteration of the triangular mesh structure representing an approximation of the estimated perimeter which is an improvement relative to the first iteration with respect to an overall distance measure between the estimated perimeter and the vertices of the triangular mesh structure.

8. The system according to claim 1, wherein:

the third interface is configured to forward a supplementary set of instructions to the processing unit, the supplementary set of instructions being received in the form of user commands and identifying an adjusted edge of the anatomic structure of interest in at least one of said image slices; and the processing unit is configured to calculate the three-dimensional shell on the further basis of the adjusted edge.

9. A processor-implemented method of contouring three-dimensional medical image data, the method comprising:

receiving, via a first interface, source data in the form of the three-dimensional medical image data, which source data represent an anatomic structure of interest that is to be contoured, and tissues adjoining the anatomic structure of interest;

selecting a first subset of the source data defining a first two-dimensional graphic representation of the source data arranged in a first image slice through the anatomic structure of interest, the first image slice having a first orientation in the source data;

outputting, via a second interface, the first subset of the source data for presentation on a graphical display; and identifying, in response to a first set of instructions received via a third interface, a first edge of the anatomic structure of interest in the first image slice, the first set of instructions being received in the form of user commands, and after having received the first set of instructions:

selecting a second subset of the source data defining a second two-dimensional graphic representation of the source data arranged in a second image slice through the anatomic structure of interest, the second image slice having a second orientation in the source data, which second orientation is different from the first orientation;

outputting, via the second interface, the second subset of the source data for presentation on the graphical display;

identifying, in response to a second set of instructions, a second edge of the anatomic structure of interest in the second image slice, the second set of instructions being received in the form of user commands; and calculating a three-dimensional shell based on the first and second edges and the source data, the three-dimensional shell representing an approximation of a delimiting surface of the anatomic structure of interest, wherein the calculation involves generating a first iteration of a triangular mesh structure that approximates the three-dimensional shell to an estimated perimeter of the anatomic structure of interest, the triangular mesh structure including a set of vertices each in which a number of triangles of the mesh structure meet, and the first iteration of the triangular mesh structure involving an analysis of:

a first intersection between the three-dimensional shell and a first plane defined by the first image slice, and a second intersection between the three-dimensional shell and a second plane defined by the second image slice, the analysis comprising, for a triangle of the triangular mesh structure forming a part of the first intersection:

searching for an image point on the first edge along a direction of a projected surface normal to said triangle, the image point being located within a search range from the first intersection, and if such an image point is found assigning an image feature of the image point found to the triangle of the triangular mesh structure; and for a second triangle of the triangular mesh structure forming a part of the second intersection:

searching for a second image point on the second edge along a direction of a projected surface normal to said second triangle, the second image point being located within a search range from the second intersection, and if such an image point is found assigning an image feature of the second image point found to the second triangle of the triangular mesh structure.

10. The method according to claim 9, wherein the three-dimensional shell is calculated in the form of a three-dimensional convex hull.

11. A non-transitory processor-readable medium, having a program recorded thereon, where the program is to make at least one processing unit execute the method according to claim 9 when the program is loaded into the at least one processing unit.

\* \* \* \* \*